H. S. CORNISH.
APPARATUS FOR DISPENSING A MEASURED QUANTITY OF BEER.
APPLICATION FILED OCT. 2, 1908.
928,588.
Patented July 20, 1909.
3 SHEETS—SHEET 2.
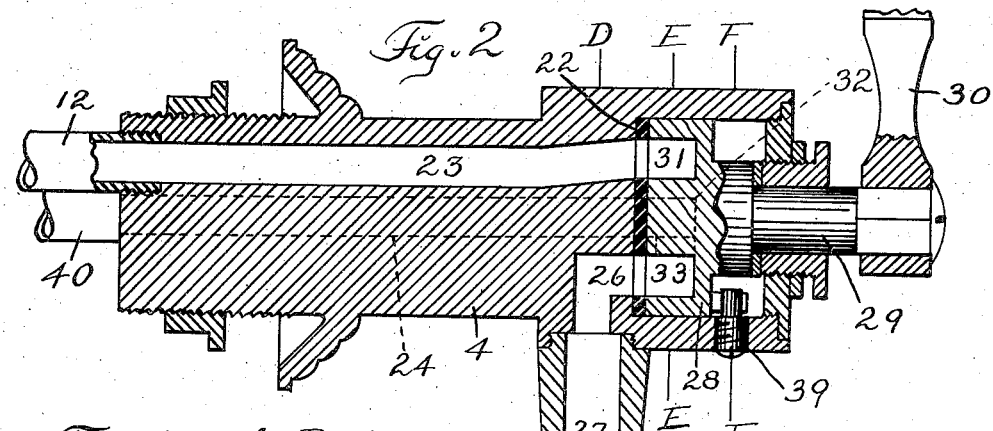
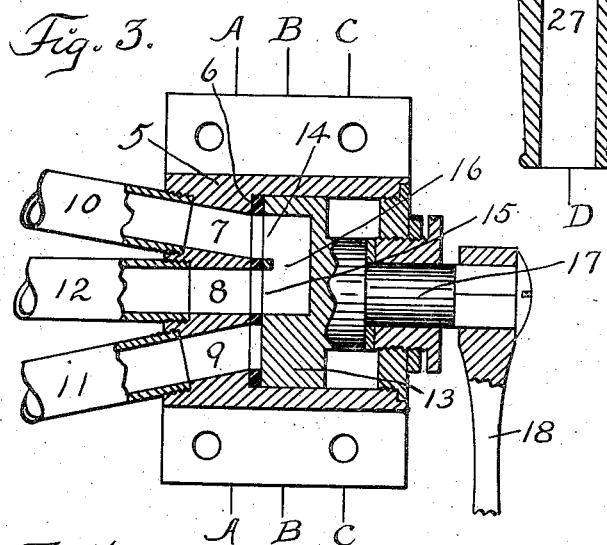
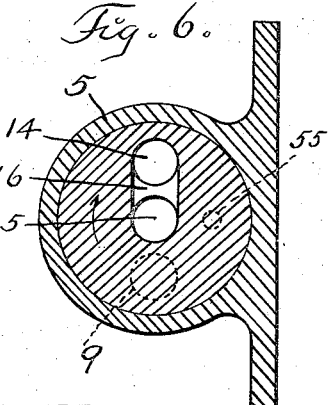
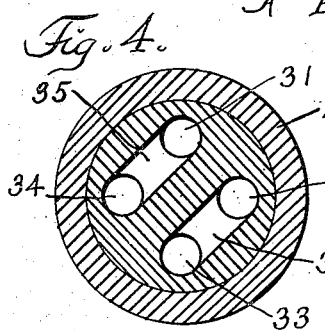
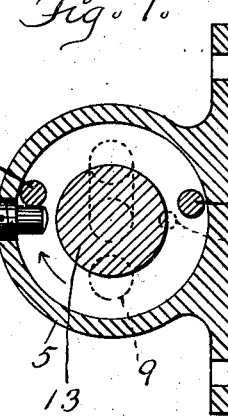
WITNESSES:
David M. Edsall
Lillian Blond
INVENTOR
Harry S. Cornish
BY
Townsend & Decker
ATTORNEYS

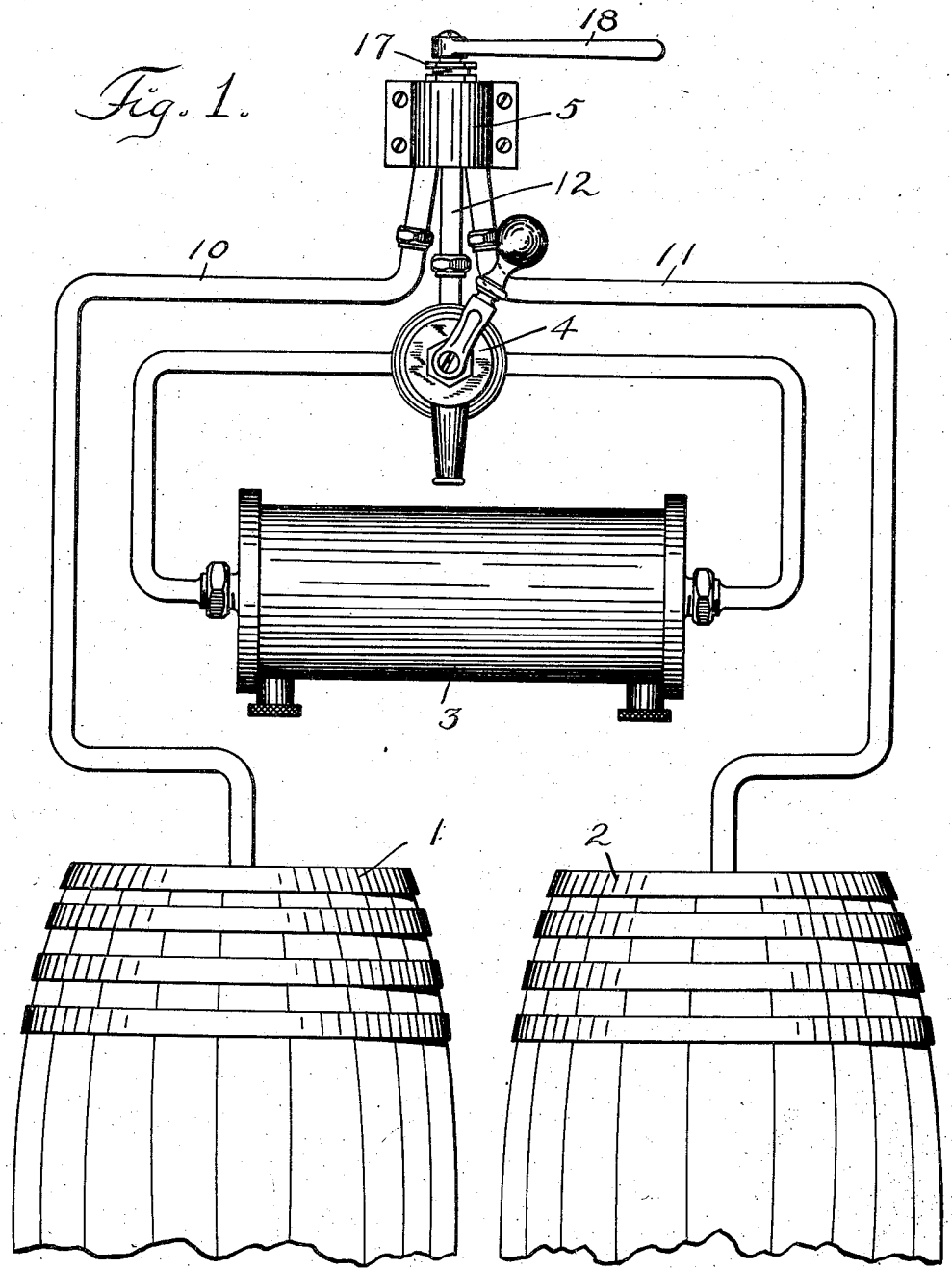

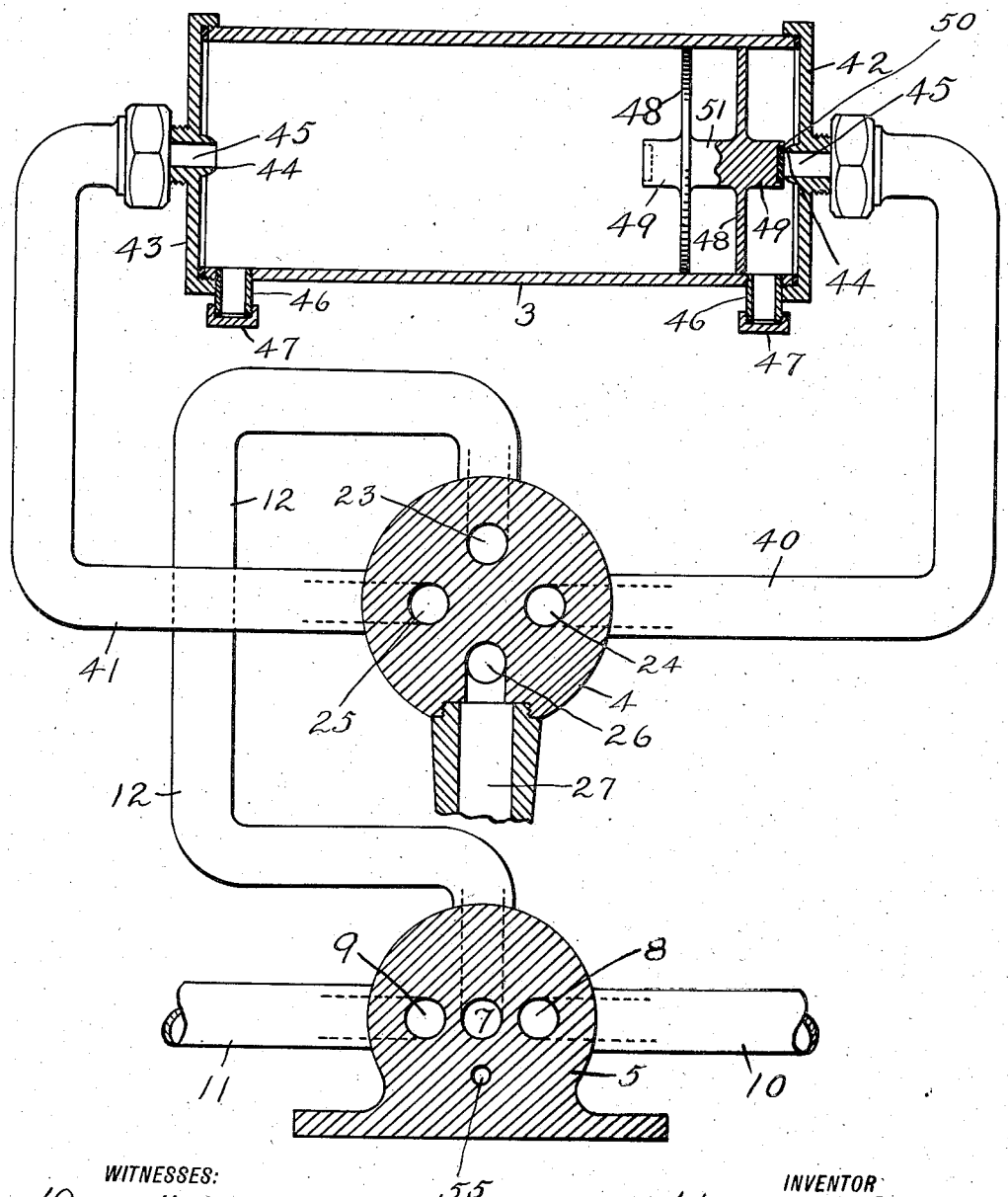

UNITED STATES PATENT OFFICE.

HARRY S. CORNISH, OF NEW YORK, N. Y., ASSIGNOR TO HARRY A. KING, OF FAR ROCKAWAY, NEW YORK.

APPARATUS FOR DISPENSING A MEASURED QUANTITY OF BEER.

No. 928,588.          Specification of Letters Patent.          Patented July 20, 1909.

Application filed October 2, 1908. Serial No. 455,904.

*To all whom it may concern:*

Be it known that I, HARRY S. CORNISH, a citizen of the United States, and a resident of New York, in the county of New York and State of New York, have invented certain new and useful Improvements in Apparatus for Dispensing a Measured Quantity of Beer, of which the following is a specification.

My invention relates to liquid dispensing apparatus and more particularly to apparatus wherein the liquid is first drawn into a measuring cylinder from a source of supply and then drawn from the measuring cylinder through a dispensing faucet so that but a definite quantity of liquid can be drawn by one operation of the faucet.

My invention is primarily designed for dispensing beer and to regulate what is known as the "pint" trade.

The main object of my invention is to avoid any waste of liquid when changing from one source of supply to another and to insure that the first liquid drawn from the new source will be of the full measured quantity.

To these ends my invention consists in providing an apparatus for drawing a measured quantity of liquid with means for changing from one source of supply to another, when the first has become exhausted, together with means for venting or freeing the air from the pipes and intermediate connections of the empty end of the system previous to connecting the new supply, so that the new supply can immediately fill the empty end and a full measured quantity drawn at the first draft from the new supply.

My invention also consists in the details of construction and combinations of parts hereinafter more particularly described and then specified in the claims.

In apparatus designed for drawing a measured quantity of liquid from a source of supply, the measuring cylinder has been connected to the source to obtain its supply and then the liquid drawn from the measuring cylinder. This is true of my apparatus, but in apparatus heretofore in use when the source of supply has become exhausted the pipes connecting the measuring cylinder with the source and the empty side of the cylinder become full of air, more or less charged, due to drawing the last measured quantity from the other side of the piston in the cylinder so that if a liquid such as beer is employed, when a new supply is connected, the liquid therefrom cannot fill the open or empty side of the cylinder due to the air located therein and therefore the next quantity of liquid drawn from the measuring cylinder will not be equal to the full amount, will be mixed with air and has to be thrown away.

In my improved apparatus, instead of the incoming or new supply of beer driving the air out of the connecting pipes and the open or empty end of the cylinder, the pipes and cylinder are freed of air first and by the same operation which transfers to the new supply and then the new beer is free to completely and immediately fill both the connecting pipes and the open end of the measuring cylinder without being mixed with air.

In the accompanying drawings, Figure 1 illustrates a general view of my improved apparatus. Fig. 2 is a longitudinal vertical central section through the dispensing faucet. Fig. 3 is a central section through the switch for changing from one source of supply to another. Fig. 4 is a transverse section taken on the line E, E Fig. 2. Fig. 5 is a similar section taken on the line F, F Fig. 2. Fig. 6 is a transverse section taken on the line B, B Fig. 3. Fig. 7 is a similar section taken on the line C, C, Fig. 3. Fig. 8 illustrates a central longitudinal section of the measuring cylinder, a transverse section through the dispensing faucet taken on the line D, D, Fig. 2, and a similar section through the switch taken on the line A, A, Fig. 2, the connecting pipes between the different parts being shown diagrammatically for clearness. Also in this view the measuring cylinder is shown on a reduced scale.

1 and 2 indicate two sources of supply such as two kegs of beer, one in use and the other in reserve.

3 indicates a piston measuring cylinder which receives its supply from the one of the two sources 1 or 2 which may be in use.

4 indicates the body of a four-way faucet, hereinafter called the dispensing faucet, and which controls the admission of liquid to the measuring cylinder 3 from the source of supply and also controls the drawing of the liquid therefrom.

5 indicates the body of a three-way valve, hereinafter called a switch, connected to both sources of supply and by means of which the change is made from one source to the other when either one becomes exhausted.

The body 5 of the switch is provided with a seat 6 and ports or passages 7, 8 and 9 extending therethrough. The port or passage 7 communicates by a pipe 10 with one source of supply while the passage 9 communicates by a pipe 11 with the other source. The central port or passage 8 establishes connection with the dispensing faucet through a pipe 12 as will be hereinafter described. A disk valve 13 adapted to turn on the seat 6 is provided with ports 14 and 15 connected by a channel 16, the port 15 being permanently registered with the port or passage 8 while the port 14 registers with port 7 or 9 according to which source it is desired to draw from, the movement of the valve being positively stopped in either direction when the ports are registered by means of pins 19, 20 projecting laterally from the disk 13 engaging a stop 21 projecting inwardly from the body 5. The valve 13 is also provided with a spindle 17 and a suitable operating handle 18 secured thereto.

Referring more particularly to Figs. 2 and 8, the body portion 4 of the dispensing faucet is provided with a seat 22 and ports or passages 23, 24, 25 extending longitudinally through the same and with a port 26 communicating with the discharge nozzle or outlet 27. A disk valve 28 adapted to turn on the seat 22 is provided with a spindle 29 and suitable operating handle 30. The valve 28 is provided with ports 31, 32, 33 and 34 in the face thereof and adapted to register with the ports in the seat of the valve body. The ports 31 and 34 in the valve are connected to each other by a channel 35 and the ports 32 and 33 are connected by a channel 36 so that the ports 31 and 34 and the channel 35 will, in one position of the valve, establish communication with the ports 23 and 25 and in the reverse movement with the ports 23 and 24. When the ports 31 and 34 establish communication between ports 23 and 25, communication is established between the ports 24 and 26 by means of ports 32 and 33 and channel 36 and similarly when ports 23 and 24 are in communication, ports 25 and 26 are in communication, the movement of the valve being limited in either direction by pins 37 and 38 hitting the stop 39 projecting through the body 4. The passage 23 in the valve body is connected by the pipe 12 with the switch 5 and the passages 24 and 25 are connected by pipes 40 and 41 to either end of the measuring cylinder so that the liquid which passes through the switch 5 is delivered to the passage 23 from which it is alternately delivered to the pipes 40, 41 leading to either end of the measuring cylinder. It will also be noted that when the valve establishes communication between the port 23 and the pipe 41 leading to one side of the cylinder, communication is established between the pipe 40 leading from the other side of the cylinder and the outlet 27 and vice versa.

Referring more particularly to Fig. 8 the measuring cylinder consists of a cylindrical sleeve 3 provided with heads 42 and 43. The pipes 40 and 41 are connected to the heads 42 and 43 respectively, the liquid passing from the pipes through a port 45 in the head to the inside of the cylinder, each head being provided with a valve seat 44 on its inner side. At or near each end of the cylinder a trap or cup is located, said trap or cup being in communication with the interior of the cylinder and consisting preferably of a sleeve 46 tapped into the cylinder 3 and provided at the bottom with a cap 47 having a screw-threaded connection with the sleeve 46 and adapted to close the lower opening therein, a suitable compressible washer being located between the cap and the end of the sleeve to insure against leakage. A piston 48 adapted to reciprocate within the cylinder 3 is provided with a boss 49 projecting laterally from either face. A compressible washer 50 inserted in the end of each boss engages the seat 44 of the port 45 and acts as a valve to close communication with the pipe 40 or 41 according to which end of the cylinder the piston travels to. The piston is stopped in its travel in either direction just as it reaches the cup 46 by means of the boss 49 and valve seat 44 so that any dirt or foreign substance which entered the cylinder with the beer will drop to the bottom or side of the cylinder and be forced along and into the cup 46 from which it can readily be removed by unscrewing the cap 47. The piston proper consists merely of two metallic disks 48 spaced somewhat apart to insure its straight travel and connected together by a hub 51, as I find that by the use of a rigid metallic piston without the employment of piston rings or packing of any kind between its periphery and the sides of the cylinder it works easier and does not stick or corrode as is the case where rings or packing are used when measuring beer. A vent hole or port 55 located in the seat 6 of the switch 5 passes through the body of the switch and is open to the atmosphere.

When changing from one source of supply to the other, the port 14 in traveling from the port 7 to the port 9 registers with the port 55 which allows the air in the pipe 12 to escape to the atmosphere. For an instance of the working of this part of my invention and referring to Fig. 8, I will assume that the keg connected to the pipe 10 is empty, the last of the liquid therein having been used in filling the cylinder at one side of the piston through the pipe 41. The valve in the dispensing faucet is now turned and communication is established between the pipe 41 and the outlet 27 to draw the contents of the cylinder, the pipe 40 being in communication with the pipe 12 from the source. As there is no further liquid to draw from the keg connected to the pipe 10, the pipe 12 and cylinder 3 will merely become filled with air as the piston moves over due to drawing the liquid from the cylinder. The valve in the switch is then turned to establish communication between the pipe 11, connected to the new source, and the pipe 12, by means of the port 14, but before the port 14 reaches the port 9 it registers with the vent port 55 whereby the air in the pipe 12 and cylinder 3 passes out to the atmosphere and allows the beer from the new supply to immediately fill the pipe 12 and cylinder 3 as soon as the port 14 reaches the port 9. If the pipe 12 and open end of the cylinder were not freed from air the new supply could not entirely fill the cylinder and as a consequence whatever liquid there would be in this side of the cylinder would have to be drawn off through the dispensing faucet and wasted as it would not be a full measured quantity and would be mostly foam.

What I claim as my invention is:—

1. In an apparatus for drawing a measured quantity of beer, the combination with two sources of supply, a measuring cylinder, a dispensing faucet having ports in communication with both ends of said cylinder, a switch in communication with both sources of supply and provided with means for changing from one source to the other, and a pipe establishing communication between said switch and said measuring cylinder through said faucet, said switch being also provided with means for venting said pipe when changing from one source of supply to the other.

2. In an apparatus for drawing a measured quantity of beer, the combination with two sources of supply, a measuring cylinder, a dispensing faucet having ports in communication with both ends of said cylinder, and a switch in communication with both sources of supply and provided with means for establishing communication between said switch and said measuring cylinder through said faucet, said switch being also provided with means for venting said pipe when changing from one source of supply to the other.

3. In an apparatus for drawing a measured quantity of beer, the combination with two sources of supply, a measuring cylinder, a dispensing faucet having ports in communication with both ends of said cylinder, a switch in communication with both sources of supply and provided with means for changing from one source to the other, a pipe establishing communication between said switch and said measuring cylinder, said switch being also provided with a passage open to the atmosphere and also with means adapted to establish communication between said atmospheric passage and said connecting pipe.

4. In an apparatus for drawing a measured quantity of beer, the combination with two sources of supply, a measuring cylinder, a dispensing faucet adapted to control the supply to either end of the cylinder and also to draw the contents from either end of said cylinder through the discharge spout of the faucet, a switch body in communication with both sources of supply, a pipe establishing communication between said switch body and said faucet whereby liquid may be supplied to either end of said cylinder through said faucet, a valve in said switch body adapted to change from one source of supply to the other, said switch body being provided with a passage whereby said pipe is opened to the atmosphere when changing from one source of supply to the other.

5. In an apparatus for drawing a measured quantity of beer, the combination with two sources of supply, a measuring cylinder, a dispensing faucet provided with ports or passages in communication with both ends of said cylinder, a switch in communication with both sources of supply and provided with means for changing from one source to the other, and a pipe connection between said switch and said faucet, said switch being provided with means adapted to automatically vent said connection when changing from one source to the other.

Signed at New York in the county of New York and State of New York this 1st day of October A. D. 1908.

HARRY S. CORNISH.

Witnesses:
C. T. TISCHNER, Jr.,
LILLIAN BLOND.